United States Patent [19]
Frederickson et al.

[11] 3,749,963
[45] July 31, 1973

[54] DEVICE TO AID IN CENTERING OF HIGH ENERGY ELECTRIC PARTICLE BEAMS IN AN EVACUATED DRIFT TUBE

[75] Inventors: Arthur R. Frederickson, Arlington; Arnold D. Morris, Braintree; Walter B. Jackson, Waltham, all of Mass.

[73] Assignee: The United States of America as represented by the Secretary of the Air Force, Washington, D.C.

[22] Filed: May 19, 1970

[21] Appl. No.: 38,677

[52] U.S. Cl...................... 315/18, 315/88, 313/152, 219/121 EB, 219/121 EM
[51] Int. Cl........................ H01j 29/70, B23k 9/00
[58] Field of Search........................ 313/83, 89, 146, 313/152, 236; 315/88, 92, 31, 21, 18; 219/121 EB, 121 EM

[56] References Cited
UNITED STATES PATENTS

| | | |
|---|---|---|
| 2,904,721 | 9/1959 | Ault ........................................ 315/21 |
| 3,555,347 | 1/1971 | Dickinson ............................... 315/18 |
| 3,112,391 | 11/1963 | Sciaky ............................ 219/121 EB |
| 3,497,666 | 2/1970 | Hansen ......................... 219/121 EB |

*Primary Examiner*—Benjamin A. Borchelt
*Assistant Examiner*—S. C. Buczinski
*Attorney*—Harry A. Herbert, Jr. and George Fine

[57] ABSTRACT

An apparatus for centering a high energy electron beam within an evacuated drift tube. An aluminum cylindrical target having mutually insulated quadrants is positioned within the tube to provide an indication of the beam position. An overload protection circuit is provided to automatically remove the target from the tube whenever an excess current condition exists.

4 Claims, 2 Drawing Figures

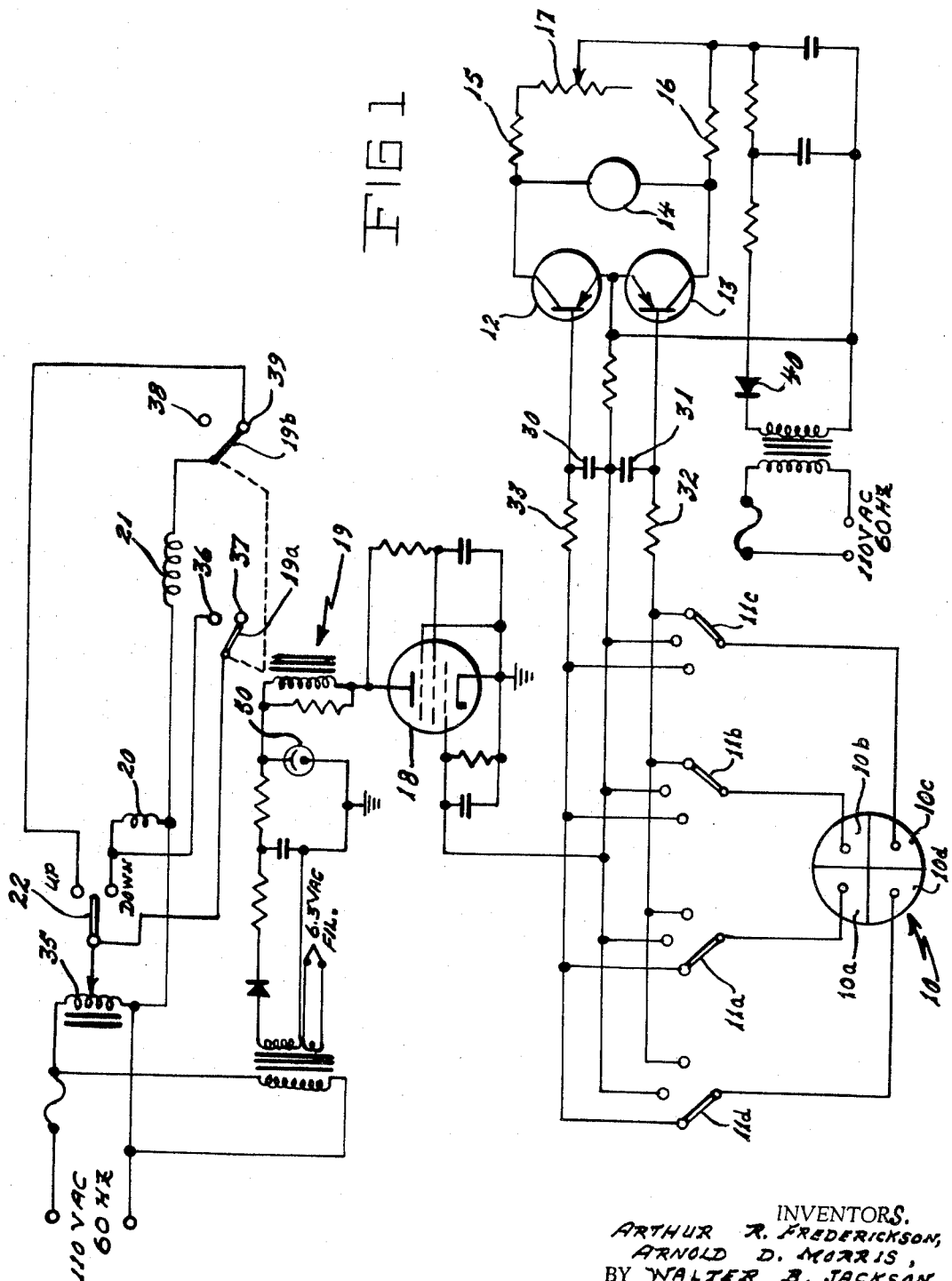

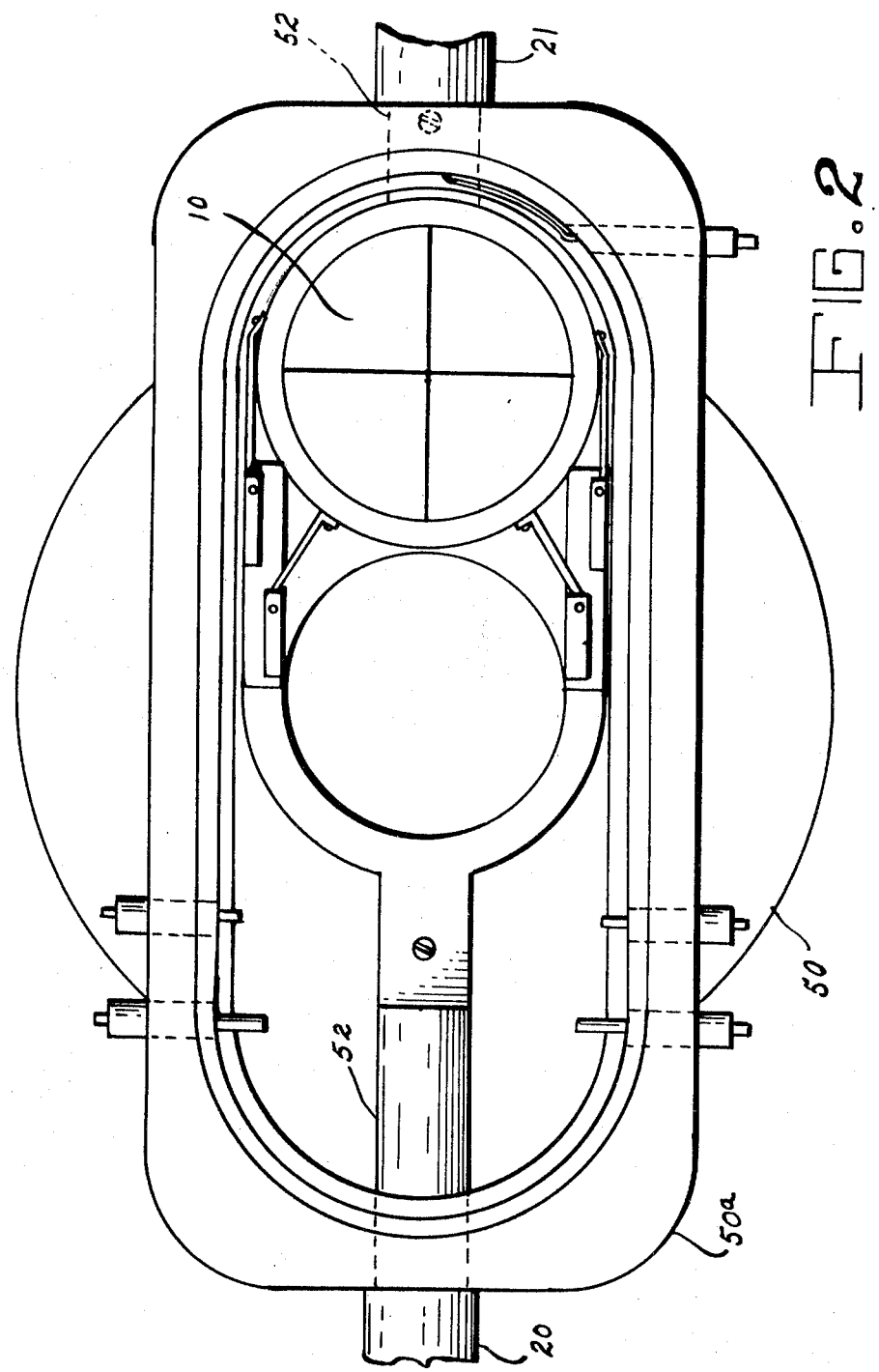

DEVICE TO AID IN CENTERING OF HIGH ENERGY ELECTRIC PARTICLE BEAMS IN AN EVACUATED DRIFT TUBE

BACKGROUND OF THE INVENTION

The present invention relates broadly to a beam positioning apparatus and in particular to a means to adjust the position of a high energy electron beam to the center of an evacuated drift tube.

In the prior art various means and methods have been employed to determine whether or not the beam from devices, such as Van de Graaff generators, linear accelerators, electron guns and other high energy particle generators is positioned properly within an evacuated drift tube. In order to determine the beam position targets must be accurately positioned in the drift tube to intercept the beam and thereby provide information relative to the beam position. This prior art method of determining beam position requires the use of dynamic vacuum seals which are prone to slight leakage in order to insert and remove targets. The problem in prior art method of overheating the target whenever too much current was applied to the target, required the need for either cooling the target or turning off the device. The present method provides an apparatus having a target that is divided into quadrants in order to exactly center the charge of the beam. The target is contained within the evacuated drift tube and is moved in and out of the center of the tube by means of magnets so that all vacuum seals are static. The problem of overheating of the target is eliminated by utilizing an overload protection circuit to automatically remove the target from the tube whenever an excess current is applied. This protection circuit also eliminates the need for cooling.

SUMMARY OF THE INVENTION

The present invention utilizes a target that is divided into four mutually insulated quadrants whereby the center of charge of the beam may be exactly centered. When an adjustment of the beam is required, an aluminum quadrature target is centered within the drift tube. The net electric current which is absorbed and emitted by each quadrant may be measured. The present apparatus will measure particles that either have an electric charge or that have no electric charge but cause a secondary emission of electrons from the aluminum target. When the currents in each quadrant are equal, the beam is positioned at the center of the drift tube. A transistorized differential current meter is used to accurately center the beam. Once the beam is properly positioned, the cylindrical target may be moved out of the path of the beam by magnets which are mounted outside the drift tube. Thus all vacuum seals are static. There is a safety circuit which will automatically remove the cylindrical target from the drift tube whenever too much current is applied to the target. This prevents overheating of the cylindrical target and eliminates the need for cooling circuits.

It is one object of the invention, therefore, to provide a high energy beam centering apparatus having a target that is divided into mutually insulated quadrants whereby the center of charge of the beam is exactly centered.

It is another object of the invention to provide a high energy beam centering apparatus having all moving parts positioned completely within the evacuated drift tube and actuated by magnets located outside the drift tube.

It is still another object of the invention to provide a high energy beam centering apparatus having vacuum seals that are static.

It is yet another object of the invention to provide a high energy beam centering apparatus having a safety circuit to automatically remove the target from the drift tube whenever excess current is applied.

It is a further object of the invention to provide a beam center apparatus that utilizes the quadrant method to position the beam at various positions within the drift tube.

These and other advantages, features and objects of the invention will become more apparent from the following description taken in connection with the illustrative embodiment in the accompanying drawings.

DESCRIPTION OF THE DRAWINGS

FIG. 1 is a schematic diagram of the high energy beam centering apparatus in accordance with this invention;

FIG. 2 is a plane view of the high energy beam centering apparatus illustrating the position of the target within the drift tube.

DESCRIPTION OF PREFERRED EMBODIMENT

Referring now to FIG. 1, there is shown a high energy beam centering apparatus utilizing an aluminum target 10 that is divided into mutually insulated quadrants whereby the center of charge of the beam is exactly centered. The upper target quadrants 10a, b are connected to switches 11a, b respectively, while the lower target quadrants 10c, d are connected to switches 11c, d respectively. Thus, by means of switches 11a-d, the current to each quadrant 10a-d may be applied to the inputs of transistors 12, 13. A microameter 14 having a range of 50-0-50 microamperes is connected between the collectors of transistors 12, 13 to measure the differential current flow in the target quadrants 10a-d. The net electric current absorbed and emitted by each quadrant 10a-d can be measured, and when the currents in each quadrant are equal, the beam is centered.

The resistance circuits comprising resistors 15, 16 and potentiometer 17 is provided to balance the quiescent current flow through transistors 12, 13 prior to inserting the target 10 into the drift tube drift tube aluminum housing 50, which is shown in FIG. 2. When it is desired to horizontally center the electron beam within the drift tube, the switches 11a-d must be placed in the positions shown in the FIG. 1. The cylindrical aluminum housing 50a is mounted in line with the drift tube 50. Referring to FIG. 2 identical characters for the same components in FIGS. 1 and 2 have been utilized to provide a better understanding of the present invention. The target 10 is positioned within the housing in such a manner that it allows the beams to pass through the invention unimpeded when not in use. The target 10 has iron plungers 52 which are mounted on opposite ends of the target 10. These iron plungers 52 are operated by electromagnets 20, 21 to move the target 10 in and out of the center position of the drift tube. When the path position of the beam is to be checked the left electromagnet coil 21 is momentarily energized by placing switch 22 (FIG. 1) in the up position to pull the target 10 to the center of the apparatus.

The steering of the beam is not accomplished by this device. This invention only serves to indicate roughly where the beam is located in the drift tube when the beam is not centered or to indicate that the beam is exactly centered. A beam traveling in the upper right quadrant 10b of the drift tube will be absorbed by the upper right quadrant 10b of the cylindrical target 10 and thus the current will be registered only in the upper right quadrant 10b. In this case by adjusting the switches 11a,b,c,d, the meter 14 will show a reading which indicates that the beam is totally within the upper right quadrant 10b. Adjustments can now be made to physically change the beam position to the center of the target 10 as reflected by the reading on the meter 14 which would be at its null position when the beam is centered. Once the beam is properly positioned, the cylindrical target 10 can be moved out of the path of the beam by placing switch 22 momentarily in the down position. When the beam has been centered, the current to the two left quadrants 10a, 10d will equal the current to the two right quadrants, 10c, 10 b and a null reading appear on the meter 14; also the current to the two upper quadrants 10a, 10b will equal the current to the two lower quadrants 10c, 10d. The total electron current flow then goes to the grid of the tube 18. If the current flow to the grid of tube 18 exceeds 15 $\mu a$, the tube 18 will draw very little plate current and relay 19 will go to the normally open (de-energized) position. Relay 19 which has a pair of ganged switches 19a, b is shown in the energized position. A VR150 (OA2) tube (50) is used to keep the voltage supply constant. When relay 19 is deenergized it will automatically energize the right electromagnet coil 20 by closing switch 19a to contact 36. The right electromagnet coil 20 acts upon the plunger which is attached to the target 10, to pull the quadrants 10a–d out of the drift tube. Thus, the current to the quadrants 10a–d ceases and the tube 18 conducts heavily again and relay 19 is energized. The target quadrants 10a–d may be reinserted by energizing the left electromagnetic coil 21 by placing switch 22 momentarily in the up position as shown by the Figure. Thus, the centering network which is comprised of the transistors 12, 13 and the meter 14 is the centering indicator, and the tube 18 and relay 19 circuit combination are the overload protection network.

The protection network can be made more or less sensitive by increasing or decreasing the resistance of the tube 18 grid resistor. The 15 $\mu a$ limit was chosen because at 10 MeV incident energy for electrons the quadrants 10a–d could remain in the beam area for approximately 10 minutes before they become overheated and melt the nylon mounting insulator. The sensitivity of the protection circuit may be increased or decreased by increasing or decreasing the grid resistor of tube 18.

The centering network must be balanced by using the potentiometer 17 to obtain a null reading on meter 14. Since all transistors do not have the same gain, it is possible to make the gain of transistors 12, 13 approximately equal by adjusting the balance control (potentiometer 17) to provide a null when equal currents are flowing to the bases of transistors 12, 13 respectively. The capacitors 30, 31 and resistors 32, 33 comprise filter circuits which prevent transient peak currents from damaging the transistors 12, 13. The use of the filter circuits is merely a design expedient which could be eliminated by utilizing transistors having superior characteristics.

The transformer 35 which is of the variable type may be adjusted so that the plungers which actuate the target quadrants 10a–d will move smoothly and not so fast that they vibrate loose. With the transformer 35 adjusted for approximately 75 volts AC 60 Hz, the operation of the plungers is substantially ideal. The friction which the magnets must overcome remains substantially constant as long as the sliding points were initially lubricated with a few drops of diffusion vacuum pump oil.

When the quadrants 10a–d are pulled completely out of the center of the drift tube, a beryllium copper wiper is grounded and the grounding actuates a panel light (not shown). This provides an indication that the quadrants 10a–d are fully removed from the drift tube and cannot interfere with the beam flow. The invention was designed to aid in steering a high energy electron beam to the center of an evacuated drift tube. It will also aid the steering of ions, or uncharged particles which are capable of knocking electrons out of electrically conducting materials. The invention will work either with particles carrying an electric charge or with particles that have no charge but cause secondary emission from aluminum, such as high energy atoms.

The invention as shown by the schematic in the Figure is arranged for a net electron flow to the target quadrants 10a–d. When a positive current flow is either expected or required, the following changes must be made: (1) bias the cathode of tube 18 to +1.5 volts with a small battery, (2) the wires on the relay 19 contacts 36, 37, 38, 39, i.e., the wire on contact 36 is placed on contact 37, the wire on contact 39 is placed on contact 38, (3) the polarity of diode 40 must be reversed and (4) the transistors 12, 13 must be changed to any low power NPN transistor having a $\beta$ of approximately 50.

While in accordance with the provisions of the statutes, we have illustrated and described the best forms of the invention now known to use, it will be apparent to those skilled in the art that changes may be made in the form of the apparatus disclosed without departing from the spirit of the invention as set forth in the appended claims, and that in some cases certain features of the invention may be used to advantage without a corresponding use of other features.

We claim:

1. An apparatus for centering high energy electric particle beams in an evacuated drift tube comprising in combination:

a cylindrical target having mutually insulated quadrants, said target being slidably mounted within said drift tube, said target intercepting said beam to provide signal representative of said beam position;

a centering network connected to said target for receiving said beam position signal, said centering network having an output in response to said signal, said output providing an indication of said beam position within said drift tube; and, means for electromagnetically positioning said target at the center of said drift tube, said electromagnet positioning means being utilized to remove said target from the path of said beam when said beam is centered.

2. A high energy beam centering apparatus as described in claim 1 further including:

a protection network connected to said centering network to receive said output signal, said protection network removing said target from said drift tube center whenever said output signal exceeds 15 microamperes.

3. A high energy beam centering apparatus as described in claim 1 wherein said centering network comprising
    a differential amplifier having a first and second transistor,
    a meter connected between the collectors of said first and second transistors to measure the differential current therebetween, and
    a resistance circuit having a first resistor in series with said first transistor collector, a second resistor in series with said second transistor collector and a potentiometer connected between said first and second resistors, one end of said potentiometer being connected to said first resistor, the wiper arm of said potentiometer being connected to said second resistor.

4. A high energy beam centering apparatus as described in claim 2 wherein said protection network comprises
    a tube having a grid connected to said centering network to receive said centering network output, said tube having an output, and
    a relay connected to said tube to receive said tube output, said relay controlling switching contacts which remove said target from the path of said beam whenever said centering network output exceeds a predetermined value.

* * * * *